United States Patent
Norikane et al.

(10) Patent No.: US 12,409,516 B2
(45) Date of Patent: Sep. 9, 2025

(54) ALUMINUM-ALLOY, FIN MATERIAL AND MANUFACTURING METHOD THEREOF

(71) Applicant: UACJ Corporation, Tokyo (JP)

(72) Inventors: Kazushige Norikane, Aichi (JP); Makoto Ando, Aichi (JP)

(73) Assignee: UACJ Corporation, Tokyo (JP)

( * ) Notice: Subject to any disclaimer, the term of this patent is extended or adjusted under 35 U.S.C. 154(b) by 185 days.

(21) Appl. No.: 18/265,997

(22) PCT Filed: Jan. 14, 2022

(86) PCT No.: PCT/JP2022/001129
§ 371 (c)(1),
(2) Date: Jun. 8, 2023

(87) PCT Pub. No.: WO2022/168566
PCT Pub. Date: Aug. 11, 2022

(65) Prior Publication Data
US 2024/0066639 A1 Feb. 29, 2024

(30) Foreign Application Priority Data

Feb. 3, 2021 (JP) ................................. 2021-015823

(51) Int. Cl.
*B23K 35/28* (2006.01)
*B23K 35/02* (2006.01)
(Continued)

(52) U.S. Cl.
CPC ........ *B23K 35/288* (2013.01); *B23K 35/0238* (2013.01); *C22C 21/00* (2013.01);
(Continued)

(58) Field of Classification Search
None
See application file for complete search history.

(56) References Cited

U.S. PATENT DOCUMENTS 10,221,472 B2 * 3/2019 Nakanishi ............... C22F 1/002
10,634,439 B2 4/2020 Nakagawa et al.
(Continued)

FOREIGN PATENT DOCUMENTS

CN 103290279 A 9/2013
CN 108699637 A 10/2018
(Continued)

OTHER PUBLICATIONS

English translation of the Written Opinion of the International Searching Authority for parent application No. PCT/JP2022/001129.
(Continued)

*Primary Examiner* — Seth Dumbris
(74) *Attorney, Agent, or Firm* — J-TEK LAW PLLC; Jeffrey D. Tekanic; Scott T. Wakeman

(57) ABSTRACT

An aluminum-alloy, fin material is composed of a brazing sheet containing a core material and filler material(s) disposed on both sides of the core material. The core material is an aluminum alloy containing 0.02-0.80 mass % Si, 0.02-0.80 mass % Fe, and 0.8-2.0 mass % Mn. The core material has a crystalline-aggregate structure in which: the orientation density of one or more of brass orientation, copper orientation, and S orientation is 20 times or more that or those of a randomly oriented sample; and the orientation densities of cube orientation, CR orientation, and P orientation are each 10 times or less than those of the randomly oriented sample. The filler material(s) is (are) composed of an Al—Si series alloy that contains 6.0-13.0 mass % Si and 0.02-0.80 mass % Fe. The clad percentage of filler material(s) is 6-16% of the total thickness of the brazing sheet.

20 Claims, 1 Drawing Sheet

(51) Int. Cl.
*C22C 21/00* (2006.01)
*C22C 21/02* (2006.01)
*C22C 21/10* (2006.01)
*C22F 1/04* (2006.01)
*C22F 1/043* (2006.01)
*C22F 1/053* (2006.01)

(52) U.S. Cl.
CPC .............. *C22C 21/02* (2013.01); *C22C 21/10* (2013.01); *C22F 1/04* (2013.01); *C22F 1/043* (2013.01); *C22F 1/053* (2013.01); *Y10T 428/12757* (2015.01)

(56) References Cited

U.S. PATENT DOCUMENTS

| | | | |
|---|---|---|---|
| 2004/0187985 A1* | 9/2004 | Matsumoto | C22F 1/05 148/692 |
| 2010/0183899 A1* | 7/2010 | Asano | C22F 1/04 428/687 |
| 2015/0218677 A1* | 8/2015 | Aruga | C22F 1/053 420/541 |
| 2018/0073118 A1 | 3/2018 | Nakagawa et al. | |
| 2018/0363995 A1 | 12/2018 | Nakagawa et al. | |
| 2020/0239989 A1* | 7/2020 | Ando | F28F 21/084 |
| 2021/0187673 A1 | 6/2021 | Kondo et al. | |

FOREIGN PATENT DOCUMENTS

| | | |
|---|---|---|
| JP | 2012017503 A | 1/2012 |
| WO | 2016147627 A1 | 9/2016 |
| WO | 2017170204 A1 | 10/2017 |

OTHER PUBLICATIONS

English translation of the International Search Report mailed Mar. 22, 2022 for parent application No. PCT/JP2022/001129.

Office Action and Search Report mailed Apr. 17, 2025, in related CN application No. 202280012193, including machine translation thereof.

* cited by examiner

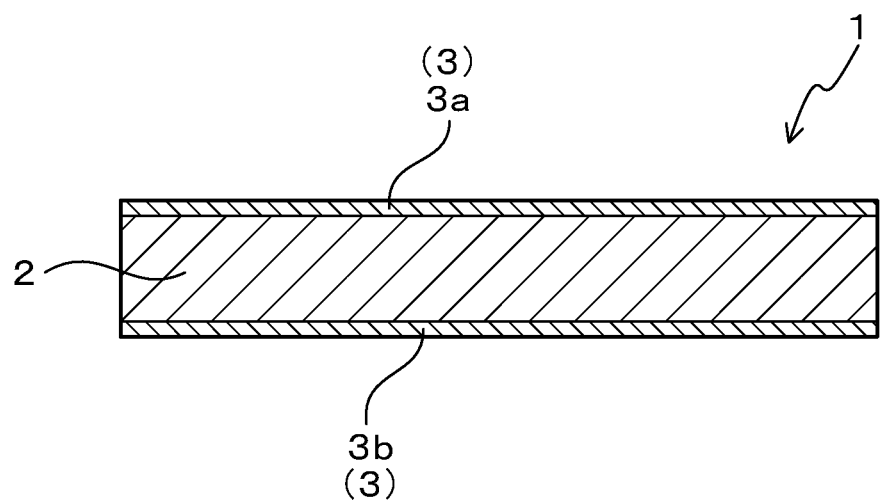

ALUMINUM-ALLOY, FIN MATERIAL AND MANUFACTURING METHOD THEREOF

CROSS-REFERENCE

This application is the US national stage of International Patent Application No. PCT/JP2022/001129 filed on Jan. 14, 2022, which claims priority to Japanese Patent Application No. 2021-015823 filed on Feb. 3, 2021.

TECHNICAL FIELD

The present invention relates to an aluminum-alloy, fin material and to a manufacturing method thereof.

BACKGROUND ART

Heat exchangers, such as condensers, radiators, heater cores, and intercoolers, are often composed of an aluminum alloy that, even among metals, has a combination of high specific strength and high thermal conductivity. This type of heat exchanger sometimes has a corrugated fin or corrugated fins. A heat exchanger having a corrugated fin or corrugated fins is manufactured by, for example, forming a fin material or fin materials into a desired shape or shapes and then joining it (them) with another member by brazing. A brazing sheet, in which a filler material has been layered on both surfaces of a core material, is used as the fin material.

In various technical fields, such as, for example, the field of automobiles, there has been strong demand in recent years to make heat exchangers lightweight and compact. To meet such a demand, there is demand to reduce thickness while maintaining strength also of fin materials used in heat exchangers.

In response to such demand, in Patent Document 1 for example, a brazing-sheet, fin material made of an aluminum alloy is disclosed, wherein: a core material is composed of an aluminum alloy that contains Si: 0.05-0.8 mass %, Fe: 0.05-0.8 mass %, and Mn: 0.8-2.0 mass %, and in which the above-mentioned Si, Fe, and Mn content satisfies the condition of Si+Fe≤Mn, the remainder being Al and unavoidable impurities; and a filler material is composed of an Al—Si series alloy that contains Si: 6.0-13.0 mass % and Fe: 0.05-0.8 mass %, the remainder being Al and unavoidable impurities. The fin material of Patent Document 1 achieves an improvement in post-brazing heating strength by controlling the metallographic structure of the core material before and after brazing heating such that it is in specific states.

PRIOR ART LITERATURE

Patent Documents

Patent Document 1
PCT International Publication No. WO 2016/147627

SUMMARY OF THE INVENTION

To improve heat-exchanging efficiency, a complex shape or complex shapes, such as a slit, a louver, or the like, is (are) sometimes imparted to the corrugated fin(s) incorporated into a heat exchanger. If an attempt is made to make the heat exchanger compact, then the dimensions of the slit(s), the louver(s), or the like, become smaller than in the past, and consequently there is demand for a fin material having ductility superior to that in the past.

However, there is a tradeoff between strength and ductility: when an attempt is made to improve ductility, there is a tendency for strength to decrease. From the viewpoint of achieving both high strength and excellent ductility, there is room for improvement in the fin material of Patent Document 1.

It is one non-limiting object of the present teachings to provide an aluminum-alloy, fin material that excels in strength and ductility, and a manufacturing method thereof.

In one aspect of the present teachings, an aluminum-alloy, fin material is composed of a brazing sheet that comprises a core material and a filler material or two different filler materials disposed on both surfaces of the core material, wherein:

the core material has:
an aluminum alloy composition that contains Si (silicon): 0.02 mass % or more and 0.80 mass % or less, Fe (iron): 0.02 mass % or more and 0.80 mass % or less, and Mn (manganese): 0.8 mass % or more and 2.0 mass % or less; and
a crystalline-aggregate structure in which: the orientation density of one or more crystal orientations selected from the group consisting of brass orientation, copper orientation, and S orientation is (are) 20 times or more that or those of a randomly oriented sample; and the orientation densities of cube orientation, CR orientation, and P orientation are each 10 times or less than those of the randomly oriented sample;
the filler material(s) is (are) composed of an Al—Si series alloy that contains Si: 6.0 mass % or more and 13.0 mass % or less and Fe: 0.02 mass % or more and 0.80 mass % or less; and
the clad percentage of each of the filler materials is 6% or more and 16% or less.

In one aspect of the present teachings, a method of manufacturing the aluminum-alloy, fin material according to the above-mentioned aspect includes:

a casting process in which are prepared: a core-material slab having an aluminum alloy composition that contains Si: 0.02 mass % or more and 0.80 mass % or less, Fe: 0.02 mass % or more and 0.80 mass % or less, and Mn: 0.8 mass % or more and 2.0 mass % or less; and a filler-material slab or two different filler-material slabs composed of an Al—Si series alloy that contains Si: 6.0 mass % or more and 13.0 mass % or less and Fe: 0.02 mass % or more and 0.80 mass % or less;
a layering process in which a clad slab is prepared by disposing the filler-material slab(s) on both surfaces of the core-material slab;
a hot-rolling process in which a clad sheet is prepared by performing hot rolling on the clad slab;
a first cold-rolling process in which cold rolling is performed on the clad sheet;
an annealing process, in which the clad sheet after the first cold-rolling process is annealed by heating it under conditions in which a total amount of diffusion M calculated according to Equation (1) below becomes $1.0 \times 10^{-14}$ m$^2$ or more and $5.0 \times 10^{-12}$ m$^2$ or less; and
a second cold-rolling process in which cold rolling is performed on the clad sheet after the annealing process.

Mathematical Equation 1

$$M = \sum_{k=1}^{n} D_0 e^{-\frac{Q}{RT(k)}} \Delta t \qquad (1)$$

Therein, n in Equation (1) is the number of intervals when the total heating time is divided into units of time Δt, $D_0$ is $1.37×10^{-5}$ m²/s, Q is 123 kJ/mol, the value of R is 8.3145 J/(mol·K), and the value of T(k) is the heating temperature [K] at the start time of the $k^{th}$ interval.

The above-mentioned aluminum-alloy, fin material (hereinbelow, called "fin material") is composed of a brazing sheet that comprises the core material and the filler material(s) disposed on both surfaces of the core material. In addition, the core material has the above-mentioned specific chemical composition and has the crystalline-aggregate structure specified by the orientation density of each of the above-mentioned crystal orientations. By setting the chemical composition and the crystalline-aggregate structure of the core material before brazing heating in accordance with the above-mentioned specific aspects, the fin material has excellent ductility.

In addition, when brazing heating is performed on the above-mentioned core material, fine precipitates can form in the core material. As a result, the strength of the core material, i.e., the strength of the fin, can be increased.

Accordingly, the above-mentioned fin material excels in ductility before brazing heating and has high strength after brazing.

The above-mentioned fin material can be prepared by the manufacturing method according to the above-mentioned aspects. In the above-mentioned manufacturing method, an annealing process is performed between the above-mentioned first cold-rolling process and the above-mentioned second cold-rolling process, wherein the clad sheet is annealed by heating it under conditions in which a total amount of diffusion M is in the above-mentioned specific range. By setting the total amount of diffusion M to the above-mentioned specific range in the annealing process, the crystalline-aggregate structure of the core material in the fin material ultimately obtained can be set in accordance with the above-mentioned specific aspects. For this reason, the above-mentioned fin material can be more easily obtained according to the manufacturing method of the above-mentioned aspects.

According to the above-mentioned aspects as described above, an aluminum-alloy, fin material that excels in strength and ductility and a manufacturing method thereof can be provided.

BRIEF DESCRIPTION OF THE DRAWING

FIG. 1 is a cross-sectional view of an aluminum-alloy, fin material according to a working example.

DETAILED DESCRIPTION (Fin Material)

The above-mentioned fin material is composed of a so-called two-sided brazing sheet comprising a core material and a filler material or filler materials, which is (are) disposed on both surfaces of the above-mentioned core material. More specifically, the brazing sheet that constitutes the fin material may comprise three layers: the core material and the filler material(s) layered on both surfaces of the core material. In addition, the brazing sheet that constitutes the fin material may have four or more layers, for example: the core material, the filler material(s), and a layer or layers other than the core material and the filler material(s) that is (are) composed of an aluminum alloy. For example, a skin material that is exposed to the outermost surface of the brazing sheet, an intermediate material interposed between the core material and a filler material, and the like are examples of a layer or layers that can be included in the brazing sheet.

<Core Material>

The core material has a chemical (aluminum alloy) composition that contains Si: 0.02 mass % or more and 0.80 mass % or less, Fe: 0.02 mass % or more and 0.80 mass % or less, and Mn: 0.8 mass % or more and 2.0 mass % or less, and has a crystalline-aggregate structure in which the orientation density of at least one crystal orientation selected from the group consisting of the crystal orientations of brass orientation, copper orientation, and S orientation is 20 times or more that or those of a randomly oriented sample and in which the orientation densities of the crystal orientations of cube orientation, CR orientation, and P orientation are each 10 times or less than those of a randomly oriented sample. The chemical composition and the crystalline-aggregate structure of the core material and reasons for restrictions thereof are explained below.

(Chemical Composition)

Si (Silicon): 0.02 Mass % or More and 0.80 Mass % or Less

The core material contains 0.02 mass % or more and 0.80 mass % or less of Si as an essential component. Si, together with Mn and Fe, forms Al—Mn—Si-based compounds and Al—Mn—Si—Fe-based compounds in the core material after brazing heating, and, owing to precipitation strengthening, acts to improve the strength of the core material.

By setting the Si content in the core material to 0.02 mass % or more, the number of Al—Mn—Si-based compounds, etc. formed in the core material can be made sufficiently large, and thereby the strength of the core material after brazing heating can be increased. From the viewpoint of further increasing the strength of the core material after brazing heating, the Si content in the core material preferably is 0.04 mass % or more. In the situation in which the Si content in the core material is less than 0.02 mass %, the amount of Al—Mn—Si-based compounds, etc. formed in the core material after brazing heating becomes insufficient, and there is a risk that it will lead to a decrease in the strength of the core material after brazing heating.

On the other hand, if the Si content in the core material becomes large, then the amount of Si solute that forms as a solid solution in the core material increases, which tends to lead to a decrease in the melting point of the core material. Then, if the melting point of the core material decreases excessively, there is a risk that the core material will be eroded by the melted filler during brazing heating, and therefore the core material becomes easier to melt. Such a problem can be easily avoided by setting the Si content in the core material to 0.80 mass % or less, preferably to 0.70 mass % or less, and more preferably to 0.60 mass % or less.

Fe (Iron): 0.02 Mass % or More and 0.80 Mass % or Less

The core material contains 0.02 mass % or more and 0.80 mass % or less of Fe as an essential component. Fe acts to promote the formation of Al—Mn—Si-based compounds and Al—Mn—Si—Fe-based compounds in the core material, increase the post-brazing strength, and stabilize the crystalline structure of the core material.

By setting the Fe content in the core material to 0.02 mass % or more, the strength of the core material after brazing can be increased, and the crystalline structure can be stabilized. From the viewpoint of further enhancing these functions and effects, the Fe content in the core material preferably is 0.05 mass % or more. In the situation in which the Fe content in the core material is less than 0.02 mass %, there is a risk that the amount of Al—Mn—Si-based compounds and Al—Mn—Si—Fe-based compounds formed in the core material will become insufficient, leading to a decrease in the strength of the core material after brazing.

On the other hand, if the Fe content in the core material becomes large, then, when the core-material slab that is to become the core material is cast in the fin-material manufacturing process, coarse crystallized products will tend to form in the core-material slab. There is a risk that the coarse crystallized products in the core-material slab will cause difficulty in the manufacture of the fin material, leading to a decrease in the ductility of the fin material. The formation of coarse crystallized products can be easily avoided by setting the Fe content in the core material to 0.80 mass % or less and preferably to 0.70 mass % or less.

Mn (Manganese): 0.8 Mass % or More and 2.0 Mass % or Less

The core material contains 0.8 mass % or more and 2.0 mass % or less of Mn as an essential component. A portion of the Mn forms a solid solution in the core material after brazing heating and, owing to solid-solution strengthening, acts to increase the strength of the core material. In addition, the remainder of the Mn, together with Si and Fe, acts to form Al—Mn—Si-based compounds and Al—Mn—Si—Fe-based compounds in the core material, thereby increasing the strength of the core material after brazing owing to precipitation strengthening.

By setting the Mn content in the core material to 0.8 mass % or more, the effects of solid-solution strengthening and precipitation strengthening are enhanced, and thereby the strength of the core material after brazing heating can be increased. From the viewpoint of further increasing the strength of the core material after brazing heating, the Mn content in the core material preferably is 1.0 mass % or more. In the situation in which the Mn content in the core material is less than 0.8 mass %, there is a risk that the amount of Mn solute formed as a solid solution in the core material after brazing heating and the amount of Al—Mn—Si-based compounds and the like formed in the core material will become insufficient, leading to a decrease in the strength of the core material after brazing heating.

On the other hand, if the Mn content in the core material becomes too much, then coarse crystallized products will tend to be formed in the core-material slab when casting the core-material slab in the fin-material manufacturing process. There is a risk that the coarse crystallized products in the core-material slab will cause difficulty in the manufacture of the fin material, leading to a decrease in the ductility of the fin material. The formation of coarse crystallized products can be easily avoided by setting the Mn content in the core material to 2.0 mass % or less and preferably to 1.8 mass % or less.

Zn (Zinc): 0.3 Mass % or More and 3.0 Mass % or Less

The core material may contain, in addition to Si, Fe, and Mn as essential components, Zn: 0.3 mass % or more and 3.0 mass % or less as an optional component. By adding Zn in the above-mentioned specific range into the core material, the electric potential of the core material can be reduced to an appropriate level, and the core material after brazing, that is, the fin in the heat exchanger, can be caused to function as a sacrificial anode. As a result, owing to the sacrificial, corrosion-inhibiting effect of the fin, corrosion of members other than the fin, such as the tube, of the heat exchanger can be inhibited over a longer time. From the viewpoint of ensuring a sacrificial, corrosion-inhibiting effect produced by the fin while also increasing self-corrosion resistance of the fin, the Zn content in the core material preferably is 0.5 mass % or more and 2.8 mass % or less and more preferably is 0.7 mass % or more and 2.7 mass % or less.

Other Elements

The above-mentioned core material may contain minute amounts of elements other than the elements described above, as long as they are within ranges such that the functions and effects described above are not impaired. For example, Mg (magnesium), Cr (chrome), Ti (titanium), Zr (zirconium), Cu (copper), and the like can be given as examples of elements that can be included in the core material. The content of each of these elements should be 0.05 mass % or less, and the total content should be 0.15 mass % or less.

[Crystalline-Aggregate Structure]

Before brazing heating, the core material has a crystalline-aggregate structure in which the orientation density of at least one crystal orientation among brass orientation, copper orientation, and S orientation is 20 times or more that of a randomly oriented sample, and the orientation densities of cube orientation, CR orientation, and P orientation are each 10 times or less that of a randomly oriented sample.

Each of the crystal orientations described above is a representative crystal orientation that exists in the aluminum alloy. The degree of development of the crystal orientation can be indicated by the magnitude of the orientation density; the higher the orientation density of a certain crystal orientation, the greater the development of that crystal orientation. The orientation density of a crystal orientation can be calculated based on the diffraction intensity of the respective crystal orientation in an X-ray diffraction chart. In addition, the magnitude of the orientation density is expressed as a percentage of the orientation density of the corresponding crystal orientation of a sample of the measurement target when the orientation density of the crystal orientation of a randomly oriented sample, i.e., a sample in which the crystal-orientation distribution is random, is used as a reference.

Among the crystal orientations described above, brass orientation, copper orientation, and S orientation act to increase the work-hardening exponent of the aluminum alloy. For this reason, the work-hardening exponent of the core material before brazing heating can be increased by setting the orientation density of one or more crystal orientations among brass orientation, copper orientation, and S orientation in the core material before brazing heating to 20 times or more of the orientation density of the corresponding crystal orientation of a randomly oriented sample. In the situation in which the orientation densities of brass orientation, copper orientation, and S orientation in the core material before brazing heating are each less than 20 times those of a randomly oriented sample, there is a risk that the effect of increasing the work-hardening exponent due to these crystal orientations will decrease.

In addition, cube orientation, CR orientation, and P orientation act to decrease the work-hardening exponent of the aluminum alloy. For this reason, a decrease in the work-hardening exponent of the core material before brazing heating can be avoided by setting the orientation densities of cube orientation, CR orientation, and P orientation in the core material before brazing heating each to 10 times or less of the orientation density of the corresponding crystal orientation of a randomly oriented sample. In the situation in which the orientation density of one or more crystal orientations among cube orientation, CR orientation, and P orientation in the core material before brazing heating is more than 10 times that or those of a randomly oriented sample, there is a risk that it will lead to a decrease in the work-hardening exponent due to these crystal orientations.

Accordingly, the work-hardening exponent of the core material can be increased by setting the crystalline-aggregate structure of the core material before brazing in accordance with the above-mentioned specific aspects. Such a core material can be easily deformed by forming work such as pressing. In addition, because such a core material increases in strength owing to work hardening after the deformation, the shape imparted by the forming work can be easily maintained. As a result of the above, a fin material comprising the above-mentioned core material has excellent ductility.

[Filler Material]

The above-mentioned fin material has a filler material or filler materials on both surfaces of the core material. The filler material disposed on one surface of the core material and the filler material disposed on the other surface may have the same chemical composition or may have chemical compositions that differ from each other. The filler material(s) is (are) composed of an Al—Si series alloy that contains Si: 6.0 mass % or more and 13.0 mass % or less and Fe: 0.02 mass % or more and 0.80 mass % or less. More specifically, the Al—Si series alloy that constitutes the filler material(s) may have a chemical composition that, for example, contains Si: 6.0 mass % or more and 13.0 mass % or less and Fe: 0.02 mass % or more and 0.80 mass % or less, the remainder being Al and unavoidable impurities.

Si: 6.0 Mass % or More and 13.0 Mass % or Less

The filler material(s) contain(s) 6.0 mass % or more and 13.0 mass % or less of Si as an essential component. Si in the filler material(s) acts to decrease the melting point of the filler material(s) as well as increase the fluidity of the melted filler. In addition, a portion of the Si in the filler material(s) diffuses into the core material during brazing heating and forms a solid solution in the core material and, together with Mn solute in the core material, can form Al—Mn—Si-based compounds and the like. Furthermore, solid-solution strengthening and precipitation strengthening have the effect of increasing the strength of the core material after brazing.

By setting the Si content in the filler material(s) to 6.0 mass % or more and preferably to 6.5 mass % or more, brazeability with the opposing material can be increased and the strength of the core material after brazing can be increased. In the situation in which the Si content in the filler material(s) is less than 6.0 mass %, there is a risk that the diffusion of Si from the filler material(s) into the core material during brazing heating will become insufficient, leading to a decrease in the strength of the core material after brazing.

On the other hand, if the Si content in the filler material(s) becomes large, the amount of Si that diffuses from the filler material(s) into the core material during brazing heating will become large. If the amount of Si that diffuses into the core material becomes excessively large, Mn that has formed as a solid solution in the core material by the formation of Al—Mn—Si-based compounds and the like will be excessively consumed. As a result, there is a risk that the amount of Mn that has formed as a solid solution in the core material after brazing will be insufficient, leading to a decrease in strength. Furthermore, in this situation, there is a risk that the amount of the melted filler produced during brazing heating will become excessively large, leading to a decrease in self-corrosion resistance. By setting the Si content in the filler material(s) to 13.0 mass % or less and preferably to 12.0 mass % or less, these problems can be easily avoided.

Fe: 0.02 Mass % or More and 0.80 Mass % or Less

The filler material(s) contain 0.02 mass % or more and 0.80 mass % or less of Fe as an essential component. Fe in the filler material(s) acts to increase the fluidity of the melted filler and to increase self-corrosion resistance.

By setting the Fe content in the filler material(s) to 0.02 mass % or more, preferably to 0.05 mass % or more, and more preferably to 0.10 mass % or more, the fluidity of the melted filler can be increased and self-corrosion resistance can be increased. In the situation in which the Fe content in the filler material(s) is less than 0.02 mass %, there is a risk that it will lead to a decrease in the fluidity of the melted filler.

On the other hand, if the Fe content in the filler material(s) becomes too much (too high), when the filler-material slab(s) that will become the filler material(s) is (are) cast in the fin-material manufacturing process, coarse crystallized products will tend to be formed in the filler-material slab(s). There is a risk that the coarse crystallized products in the filler-material slab(s) will cause difficulty in the manufacture of the fin material, leading to a decrease in the ductility of the fin material. By setting the Fe content in the filler materials to 0.80 mass % or less, preferably to 0.70 mass % or less, and more preferably to 0.60 mass % or less, these problems can be easily avoided.

Sr (Strontium): 0.005 Mass % or More and 0.050 Mass % or Less

The above-mentioned filler materials may contain, in addition to Si and Fe as essential components, Sr: 0.005 mass % or more and 0.050 mass % or less as an optional component. Sr in the filler materials acts to increase the fluidity of the melted filler. By adding Sr in the above-mentioned specific range into the filler material(s), brazeability can be further enhanced.

Other Elements

The filler material(s) may contain minute amounts of elements other than the elements described above, as long as they are within ranges such that the functions and effects described above are not impaired. For example, Mg, Cr, Ti, Zr, Cu, and the like can be given as examples of elements that can be included in the filler material(s). The content of each of these elements should be 0.05 mass % or less, and the total content should be 0.15 mass % or less.

<Thickness>

The thickness of the above-mentioned fin material can be set as appropriate within a range of, for example, 40 μm or more and 140 μm or less.

<Clad Percentage>

The clad percentage of each of the filler material(s) in the above-mentioned fin material is 6% or more and 16% or less. By setting the clad percentage of each of the filler material(s) to 6% or more, the amount of melted filler produced during brazing heating can be made sufficiently large, and the amount of Si that diffuses from the filler material(s) into the core material can be made appropriately large. As a result, brazeability can be enhanced, and the strength of the core material after brazing can be increased. In the situation in which the clad percentage of either of the filler material(s) is less than 6%, there is a risk that it will lead to degradation in brazeability owing to insufficiency of the melted filler and lead to a decrease in the strength of the core material after brazing.

On the other hand, if the clad percentage becomes high, then the amount of Si that diffuses from the filler material(s) into the core material during brazing heating will become large, and Mn that forms as a solid solution in the core material will tend to be consumed. As a result, there is a risk that it will lead to a decrease in the effect of increasing strength due to solid-solution strengthening, and thereby to a decrease in the strength of the core material after brazing.

Such problems can be easily avoided by setting the clad percentage of the filler material(s) to 16% or less, preferably to 14% or less, and more preferably to 12% or less.

<Work-Hardening Exponent>

The above-mentioned fin material preferably has the characteristic in that the work-hardening exponent at the yield point is 0.07 or higher and more preferably has the characteristic in that the work-hardening exponent at the yield point is 0.08 or higher. The work-hardening exponent is an exponent that indicates the degree of increase in strength due to work hardening, given the application of the same strain, which means that the higher the value of the work-hardening exponent, the greater becomes the amount of increase in strength.

With regard to a fin material having a work-hardening exponent in the above-mentioned specific range, the amount of increase in strength due to forming work, such as pressing, can be made larger. For this reason, when performing forming work, the fin material can be easily deformed into a desired shape, and the shape imparted by the forming work can be easily maintained after the completion of the forming work. Thus, the ductility of the fin material can be further increased by setting the work-hardening exponent of the fin material to the above-mentioned specific range.

The work-hardening exponent of the fin material can be calculated by the following method. First, the longitudinal direction is set parallel to the rolling direction, and a No. 13B test piece, as stipulated in JIS Z2241:2011, is sampled from the fin material. Next, a tension test is performed in a room-temperature environment in accordance with the method stipulated in JIS Z 2241:2011. Furthermore, the values of the test force and the plastic strain at the yield point and the value of the test force at the point at which the plastic strain has increased 0.1% from the yield point are specified from a test-force—strain curve obtained by the tension test. Furthermore, the work-hardening exponent, which is calculated by a two-point method using these values, is taken as the work-hardening exponent of the fin material.

More specifically, work-hardening exponent n of the fin material is a value calculated by Equation (2) below using: test force F (unit: N) at the yield point; plastic strain $e_1$ (unit: %); and test force $F_2$ (unit: N) at the point where the plastic strain has increased 0.1% from the yield point.

Mathematical Equation 2

$$n = \frac{\log\frac{(1+e_1)F_1}{\{1+(e_1+0.1)\}F_2}}{\log\frac{\log(1+e_1)}{\log\{1+(e_1+0.1)\}}} \quad (2)$$

(Fin-Material Manufacturing Method)

The above-mentioned fin material is prepared by a manufacturing method having, for example: a casting process, in which a plurality of aluminum-alloy ingots, which includes a core-material slab that is to become the core material and filler-material slab(s) that is (are) to become the filler material(s), is prepared; a layering process, in which a clad slab is prepared by disposing the above-mentioned filler-material slabs on both surfaces of the above-mentioned core-material slab; a hot-rolling process, in which a clad sheet is prepared by performing hot rolling on the above-mentioned clad slab; a first cold-rolling process, in which cold rolling is performed on the above-mentioned clad sheet; an annealing process, in which the clad sheet after the above-mentioned first cold-rolling process is heated to anneal it; and a second cold-rolling process, in which cold rolling is performed on the above-mentioned clad sheet after the above-mentioned annealing process.

<Casting Process>

In the casting process, the methods of preparing the core-material slab and the filler-material slab(s) are not particularly limited. For example, a well-known casting method, such as semicontinuous casting, can be used as the method of preparing the core-material slab and the filler-material slab(s). In the situation in which the core-material slab is to be prepared by semicontinuous casting, for example, casting should be performed such that, after the molten metal is supplied to the die, the average cooling rate is 0.5° C./s or more until the molten metal solidifies.

In addition, in the situation in which the core-material slab is to be prepared by semicontinuous casting, it is preferable to cool the core-material slab such that, from the point in time when the temperature of the core-material slab has become 550° C. until the temperature reaches 200° C., the average cooling rate is 0.10° C./s or more. By setting the average cooling rate of the core-material slab to the above-mentioned specific range, excessive precipitation of Al—Mn—Si-based compounds and the like into the core-material slab can be avoided. From the same viewpoint, it is more preferable to cool the core-material slab such that, from the point in time when the temperature of the core-material slab has become 550° C. until the temperature reaches 200° C., the average cooling rate is 0.13° C./s or more.

The core-material slab and the filler-material slab(s) obtained in the casting process may be provided, as is, to the layering process. In addition, the core-material slab and the filler-material slab(s) can also be provided to the layering process after face milling has been performed on the core-material slab and/or the filler-material slab(s) and ingot-segregation layers formed on the surface(s) have been removed. Furthermore, the thicknesses thereof can also be adjusted by performing hot rolling on the core-material slab and/or the filler-material slabs such that the clad percentage of the ultimately obtained fin material becomes a desired value. In the situation in which, in addition to the core material and the filler material(s), a fin material is to be prepared that comprises a layer composed of an aluminum alloy other than the core material and the filler material(s), in addition to the core-material slab and the filler-material slab(s), an aluminum-alloy ingot other than these may be prepared in the casting process.

<Homogenization-Treatment Process>

The above-mentioned manufacturing method may include a homogenization-treatment process, in which a homogenization treatment is performed on the core-material slab by heating it after the casting process has been performed and before the layering process is performed. In the homogenization-treatment process, for example, the hold temperature can be selected as appropriate from the range of 420° C. or higher and lower than 510° C., and the hold time can be selected as appropriate from the range of 0.5 hour or more and 12 hour or less.

<Layering Process>

In the layering process, the clad slab is prepared by overlaying, on both surfaces of the core-material slab, filler-material slabs and an aluminum-alloy ingot, which is other than the filler-material slabs and is provided as needed. By preparing the clad slab in this manner, the fin material, in which filler material(s) is (are) disposed on both surfaces of the core material, can be obtained.

<Hot-Rolling Process>

In the hot-rolling process, by performing hot rolling on the clad slab, ingots adjacent to each other in the clad slab are joined together while at the same time reducing their thicknesses. Thereby, a clad sheet can be obtained in which the filler material(s) is (are) disposed on both surfaces of the core material. In the hot-rolling process, hot rolling should be performed after the clad slab has been preheated to a temperature range of 420° C. or higher and 500° C. or lower and preferably to a temperature range of 430° C. or higher and 490° C. or lower. By setting the rolling-start temperature to the above-mentioned specific range, adjacent ingots can be easily joined to each other while avoiding excessive precipitation of Al—Mn—Si-based compounds and the like in the core material of the clad sheet. Thereby, the amount of Mn formed as a solid solution in the core material in the fin material ultimately obtained can be made sufficiently large, the ductility of the fin material before brazing can be enhanced, and the strength of the fin after brazing can be increased.

In the situation in which preheating of the core-material slab is performed, it is preferable to perform preheating such that the hold time of the rolling-start temperature is 0.5 hour or more and 12 hours or less. By setting the hold time to the above-mentioned specific range, excessive precipitation of Al—Mn—Si-based compounds and the like in the core material can be more reliably avoided. From the same viewpoint, it is preferable to perform preheating of the core-material slab such that the time from the point in time when preheating is started until the rolling-start temperature is reached is within 15 hours.

In addition, in the hot-rolling process, it is preferable to perform hot rolling such that the temperature of the clad sheet—at the point in time when the rolling reduction of the hot rolling, i.e., the reduction percentage of the thickness of the clad sheet relative to the thickness of the clad slab at the start of the hot rolling, has reached 10%—becomes 370° C. or higher and 450° C. or lower, and it is more preferable to perform hot rolling until the temperature becomes 380° C. or higher and 440° C. or lower. In addition, in the hot-rolling process, it is preferable to perform hot rolling such that the temperature of the clad sheet at completion becomes lower than 370° C., and it is more preferable to perform hot rolling such that the temperature becomes 350° C. or lower. In addition, in the hot-rolling process, it is preferable to perform hot rolling such that the time from the point in time when hot rolling is started until the point in time when hot rolling has completed is 60 min or less, and preferable to perform hot rolling such that the time is 40 min or less. By performing hot rolling under such conditions, excessive precipitation of Al—Mn—Si-based compounds and the like in the core material can be more reliably inhibited.

<First Cold-Rolling Process>

The clad sheet after the hot-rolling process has completed is provided to the first cold-rolling process, without performing annealing. In the first cold-rolling process, one or more passes of cold rolling is performed on the clad sheet, which was obtained by the hot-rolling process, to reduce the thickness of the clad sheet such that it is thicker than the thickness of the desired fin material. In the situation in which multiple passes of cold rolling are performed in the first cold-rolling process, annealing is not performed between passes. In the first cold-rolling process, cold rolling should be performed such that, for example, the rolling reduction, i.e., the reduction percentage (unit: %) of the thickness of the clad sheet resulting from the first cold-rolling process relative to the thickness of the clad sheet after the hot-rolling process has completed, becomes 85.0% or more and 99.5% or less.

<Annealing Process>

After the first cold-rolling process has been completed, the annealing process, in which the clad sheet is heated to anneal it, is performed. In the annealing process, the clad sheet is heated under the condition(s) that the total diffusion amount M, which is calculated according to Equation (1) below, becomes $1.0 \times 10^{-14}$ m² or more and $5.0 \times 10^{-12}$ m² or less.

Mathematical Equation 3

$$M = \sum_{k=1}^{n} D_0 e^{-\frac{Q}{RT(k)}} \Delta t \tag{3}$$

Therein, n in the above-mentioned Equation (1) is the number of intervals when the total heating time is divided into units of time $\Delta t$, Do is $1.37 \times 10^{-5}$ m²/s, Q is 123 kJ/mol, the value of R is 8.3145 J/(mol·K), and the value of T(k) is the heating temperature (unit: K) at the start time of the $k^{th}$ interval.

When the clad sheet is heated in the annealing process, the aluminum atoms diffuse and the crystal lattice is rearranged. By limiting the amount of diffusion of the aluminum atoms in the annealing process to a suitable range, the crystalline-aggregate structure of the core material in the clad sheet after the annealing process can be controlled in accordance with a desired aspect and, in turn, the crystalline-aggregate structure of the core material in the ultimately obtained fin material can be set in accordance with the above-mentioned specific aspects.

More specifically, self-diffusion coefficient D of the aluminum atoms is expressed by Equation (3) below using temperature T (unit: K) of the clad sheet.

$$D=D_0 \exp(-Q/RT) \tag{3}$$

For this reason, in the situation in which temperature T is constant, the amount of diffusion of the aluminum atoms can be calculated by multiplying the hold time using diffusion coefficient D calculated in the above-mentioned Equation (3). However, in the actual annealing process, the temperature sometimes fluctuates, for example, in the time from the heating start until the hold temperature is reached, in the time until cooling after heating end has been completed, or the like. In the above-mentioned Equation (1), the value of the total amount of diffusion M is calculated by dividing the time from the start of annealing to the completion of annealing into units of time $\Delta t$ and then summing the products of the self-diffusion coefficient for each interval and the unit of time $\Delta t$. For this reason, according to the above-mentioned Equation (1), the total amount of diffusion M, which has taken into consideration the fluctuation in temperature described above, can be calculated.

In the above-mentioned manufacturing method, by heating the clad sheet such that the total amount of diffusion M in the annealing process becomes the above-mentioned specific range, the aluminum atoms are caused to diffuse appropriately, brass orientation, S orientation, and copper orientation are caused to develop in the core material, and the development of cube orientation, CR orientation, and P orientation in the core material can be inhibited. As a result, the crystalline-aggregate structure of the core material in the fin material ultimately obtained can be set in accordance with the above-mentioned specific aspects.

In the situation in which the total amount of diffusion M in the annealing process is less than $1.0 \times 10^{-14}$ m$^2$, the development of brass orientation, S orientation, and copper orientation tends to become insufficient. In addition, in the situation in which total diffusion amount M is larger than $5.0 \times 10^{-12}$ m$^2$, the development of cube orientation, CR orientation, and copper orientation tends to be promoted. For this reason, in the situation in which the total amount of diffusion M in the annealing process is outside of the above-mentioned specific range, there is a risk that it will lead to degradation in the ductility of the fin material.

It is noted that, in connection with the calculation of the total amount of diffusion M, the unit of time $\Delta t$ should be set to an appropriate value such that the difference between the temperature of the clad sheet at the start time of each interval and the temperature of the clad sheet at the end time of each interval is sufficiently small. The unit of time $\Delta t$ can be set to, for example, 1 min.

<Second Cold-Rolling Process>

In the second cold-rolling process, one or more passes of cold rolling is performed on the clad sheet after the annealing process has been completed, and thereby a fin material having the desired thickness is obtained. In the situation in which multiple passes of cold rolling are performed in the second cold-rolling process, annealing is not performed between passes.

Working Examples

Working examples of the above-mentioned aluminum-alloy, fin material and manufacturing method thereof are explained below. It is noted that specific aspects of the aluminum-alloy, fin material and manufacturing method thereof according to the present invention are not limited to the aspects of the working examples below and can be modified as appropriate within a range that does not limit the gist of the present invention.

As shown in FIG. 1, a fin material 1 according to the present examples is composed of a brazing sheet comprising a core material 2 and a filler material 3, which is disposed on both surfaces of the core material 2. The core material 2 has a chemical (aluminum alloy) composition that contains Si: 0.02 mass % or more and 0.80 mass % or less, Fe: 0.02 mass % or more and 0.80 mass % or less, and Mn: 0.8 mass % or more and 2.0 mass % or less. In addition, the core material 2 has a crystalline-aggregate structure such that the orientation density of one or more crystal orientations selected from the group consisting of brass orientation, copper orientation, and S orientation is 20 times or more that or those of a randomly oriented sample and such that the orientation densities of cube orientation, CR orientation, and P orientation are each 10 times or less that of a randomly oriented sample. The filler material 3 is composed of an Al—Si series alloy that contains Si: 6.0 mass % or more and 13.0 mass % or less and Fe: 0.02 mass % or more and 0.80 mass % or less. The clad percentage of each of the filler materials 3 is 6% or more and 16% or less. The compositions and manufacturing method of the fin material 1 according to the present examples are more specifically explained below.

The chemical compositions of the core material 2 used in the present example are listed in Table 1. In addition, the chemical compositions of the filler materials 3 used in the present examples are listed in Table 2. In Table 1 and Table 2, the symbol "Bal" is a symbol that indicates "remainder," and the symbol "-" is a symbol that indicates that the content of the particular element is under the detection limit of the spark-discharge, emission-spectral-analysis apparatus.

TABLE 1

| Alloy Symbol | Chemical Composition (mass %) | | | | |
|---|---|---|---|---|---|
| | Si | Fe | Mn | Zn | Al |
| A1 | 0.04 | 0.09 | 1.20 | 1.08 | Bal. |
| A2 | 0.29 | 0.15 | 1.17 | 1.47 | Bal. |
| A3 | 0.49 | 0.23 | 1.17 | 2.49 | Bal. |
| A4 | 0.49 | 0.18 | 1.16 | 2.50 | Bal. |
| A5 | 0.24 | 0.16 | 1.20 | 0.46 | Bal. |
| A6 | 0.26 | 0.55 | 1.12 | 0.01 | Bal. |

TABLE 2

| Alloy Symbol | Chemical Composition (mass %) | | | |
|---|---|---|---|---|
| | Si | Fe | Sr | Al |
| B1 | 8.85 | 0.14 | — | Bal. |
| B2 | 8.91 | 0.23 | — | Bal. |
| B3 | 7.44 | 0.19 | 0.016 | Bal. |
| B4 | 7.45 | 0.16 | 0.016 | Bal. |
| B5 | 7.84 | 0.22 | — | Bal. |
| B6 | 7.80 | 0.34 | — | Bal. |
| B7 | 7.39 | 0.21 | — | Bal. |
| B8 | 10.17 | 0.35 | — | Bal. |

With regard to the preparation of the fin material 1 according to the present examples, first, core-material slabs having the chemical compositions listed in Table 1 and filler-material slabs having the chemical compositions listed in Table 2 were prepared by semicontinuous casting (casting process). With regard to the core-material slabs having the chemical compositions listed in alloy symbol A1 and alloy symbols A3-A6, the homogenization treatment was performed on the core-material slabs after casting by holding them at a temperature of 500° C. for 8 hours. It is noted that the homogenization treatment was not performed on the core-material slab having the chemical composition listed in alloy symbol A2. The surfaces of the core-material slabs and the filler-material slabs obtained in this manner were face milled to remove ingot-segregation layers. In addition, in the present examples, hot rolling was performed on the filler-material slabs to adjust the thickness of the filler-material slabs such that the clad percentage of the fin materials ultimately obtained became a desired value.

Next, clad slabs were prepared (layering process) by overlaying filler-material slabs on both surfaces of the core-material slabs in accordance with the combinations listed in Table 3. After the clad slabs were preheated, hot rolling was performed (hot-rolling process), and thereby the clad sheets were obtained. Next, cold rolling was performed (first cold-rolling process) on the clad sheets to reduce the thickness of the clad sheets until they were thicker than the desired fin material thickness.

The clad sheets after the first cold-rolling process was completed were annealed by heating them under the condition(s) that the total amount of diffusion M became the values listed in Table 3 (annealing process). Thereafter, cold rolling was further performed on the clad sheets to reduce the thickness of the clad sheets until they became the values listed in Table 3 (second cold-rolling process). Based on the above, the fin materials 1 (Test Materials S1-S3) listed in Table 3 could be obtained.

It is noted that, for the sake of convenience in the present example, the filler material 3 layered on one surface of the core material 2 is referred to as first filler material 3a, and the filler material 3 layered on the other surface is referred to as second filler material 3b. The clad percentages of the first filler materials 3a and the second filler materials 3b are each as listed in Table 3.

In addition, Test Materials S4-S6 listed in Table 3 are test materials for the purpose of comparison with Test Materials S1-S3. The method of preparing Test Materials S4-S6 was the same as the method of preparing Test Materials S1-S3, other than that the heating conditions in the annealing process were modified such that the total amount of diffusion M deviated from the above-mentioned specific range.

The method of evaluating the crystalline-aggregate structure of the fin material 1, the method of measuring the work-hardening exponent, and the method of evaluating the strength of the fin after brazing are explained below.

<Method of Evaluating the Crystalline-Aggregate Structure>

A test piece exhibiting a square shape in which one side was 25 mm was sampled from a center portion, in the direction perpendicular to rolling, of each fin material 1. The surfaces, 25 mm longitudinal×25 mm transverse, of each test piece were ground until the thickness of the test piece became one-half the thickness of the fin material, thereby exposing the core material 2. Next, the test piece was immersed for 10 seconds in a liquid etchant, which was composed of a mixture of nitric acid, hydrochloric acid, and hydrofluoric acid, to etch the surfaces of the core material 2.

Next, the surfaces of the core material 2 of each test piece were irradiated with X-rays, and an X-ray diffraction measurement was performed using a reflection method. Thereby, a pole figure of the surface of the core material 2 was acquired. Then, three-dimensional analysis was performed on the pole figure of the core material 2 according to a series expansion method using spherical harmonics, and thereby the orientation density of each crystal orientation existing in the core material 2 was calculated. A measurement and an analysis the same as these were performed on a randomly oriented sample to calculate the orientation density of each crystal orientation existing in the randomly oriented sample. It is noted that a sample, in which the crystal orientations in the sample are not oriented in any specific direction, such as, for example, aluminum powder, should be used as the randomly oriented sample.

Subsequently, the ratios of the orientation densities of the core material 2 to the orientation densities of the randomly oriented sample were calculated. The ratios of the orientation densities of the crystal orientations for each test material were the values listed in Table 3.

<Method of Measuring the Work-Hardening Exponent>

The fin material 1 was set such that the longitudinal direction was parallel to the rolling direction, and a No. 13B test piece, as stipulated in JIS Z2241:2011, was sampled from the fin material 1. Next, a tension test was performed in a room-temperature environment in accordance with the method stipulated in JIS Z 2241:2011. Then, the values of the test force and the plastic strain at yield point and the value of the test force at the point at which the plastic strain increased 0.1% from the yield point were specified from the test-force-strain curve obtained by the tension test. Furthermore, using these values, the work-hardening exponent was calculated using a two-point method. The work-hardening exponents of the test materials were the values listed in Table 3.

<Evaluation of the Strength of the Fin After Brazing>

The strength of the fin after brazing could be evaluated based on the tensile strength of the test material, which was heated under conditions that simulated brazing heating. Specifically, first, the fin material 1, which had been cut to an appropriate size, was disposed inside a brazing furnace and heated in a nitrogen atmosphere. Heating was completed at the point in time when the temperature inside the furnace reached 600° C., after which the fin material 1 was cooled inside the furnace. After the fin material 1, which was removed from the brazing furnace, cooled naturally to room temperature, the fin material 1 was set such that the longitudinal direction was parallel to the rolling direction and a No. 13B test piece, as stipulated in JIS Z2241:2011, was sampled from the fin material 1.

Using the test piece prepared in this manner, a tension test was performed in a room-temperature environment in accordance with the method stipulated in JIS Z 2241:2011. Table 3 lists the tensile strength after brazing of each of the test materials.

TABLE 3

| | | Unit | Test Material S1 | Test Material S2 | Test Material S3 | Test Material S4 | Test Material S5 | Test Material S6 |
|---|---|---|---|---|---|---|---|---|
| Core material | Alloy type | — | A1 | A2 | A3 | A4 | A5 | A6 |
| First core material | Alloy type | — | B1 | B3 | B5 | B6 | B7 | B8 |
| | Clad percentage | % | 10.9 | 8.5 | 10.9 | 9.1 | 9.4 | 8.0 |
| Second core material | Alloy type | — | B2 | B4 | B5 | B6 | B7 | B8 |
| | Clad percentage | % | 10.8 | 8.9 | 10.6 | 9.8 | 10.6 | 7.7 |
| Thickness of fin material | | mm | 0.07 | 0.07 | 0.07 | 0.13 | 0.07 | 0.10 |
| Total amount of diffusion M in annealing process | | m$^2$ | $1.8 \times 10^{-12}$ | $1.8 \times 10^{-12}$ | $4.0 \times 10^{-13}$ | $4.2 \times 10^{-11}$ | $4.2 \times 10^{-11}$ | $4.2 \times 10^{-11}$ |
| Orientation density | Brass orientation | times | 11 | 6 | 8 | <1 | <1 | <1 |
| | Copper orientation | times | 14 | 28 | 18 | <1 | <1 | <1 |
| | S orientation | times | 25 | 26 | 25 | 2 | 2 | 2 |
| | Cube orientation | times | <1 | <1 | <1 | 1 | 1 | 2 |
| | CR orientation | times | 2 | 2 | 1 | <1 | <1 | 1 |
| | P orientation | times | <1 | 2 | 2 | 82 | 71 | 67 |

TABLE 3-continued

|  | Unit | Test Material S1 | Test Material S2 | Test Material S3 | Test Material S4 | Test Material S5 | Test Material S6 |
|---|---|---|---|---|---|---|---|
| Work-hardening exponent before brazing heating | — | 0.12 | 0.11 | 0.09 | 0.06 | 0.05 | 0.05 |
| Tensile strength after brazing heating | MPa | 156 | 155 | 162 | 137 | 146 | 164 |

As shown in Table 1 to Table 3, each of Test Materials S1-S3 comprised: a core material 2 having the above-mentioned specific chemical compositions and crystalline-aggregate structures; and a filler material 3 having the above-mentioned specific chemical compositions. In addition, the clad percentages of the filler materials 3 for Test Materials S1-S3 were all within the above-mentioned specific range. Each of Test Materials S1-S3 having such a composition had a high work-hardening exponent, excelled in ductility, and also excelled in strength after brazing heating.

On the other hand, annealing was performed on Test Materials S4-S6 under conditions in which the total amount of diffusion M became greater than those of Test Materials S1-S3. Consequently, with regard to Test Materials S4-S6, aluminum atoms of the core material diffused excessively during annealing, the orientation densities of brass orientation, S orientation, and copper orientation became low, and the development of cube orientation, CR orientation, and copper orientation was promoted. As a result, Test Materials S4-S6 were poor in ductility compared with Test Materials S1-S3.

The invention claimed is:

1. An aluminum-alloy, fin material composed of a brazing sheet that comprises a core material and either a first filler material disposed on first and second surfaces of the core material or the first filler material disposed on the first surface of the core material and a second filler material disposed on the second surface of the core material, wherein:
   the core material has:
      an aluminum alloy composition that contains Si: 0.02 mass % or more and 0.80 mass % or less, Fe: 0.02 mass % or more and 0.80 mass % or less, and Mn: 0.8 mass % or more and 2.0 mass % or less; and
      a crystalline-aggregate structure in which: the orientation density of one or more crystal orientations selected from the group consisting of brass orientation, copper orientation, and S orientation is 20 times or more that or those of a randomly oriented sample; and the orientation densities of cube orientation, CR orientation, and P orientation are each 10 times or less than those of the randomly oriented sample;
   the first and second filler materials are each composed of an Al—Si series alloy that contains Si: 6.0 mass % or more and 13.0 mass % or less and Fe: 0.02 mass % or more and 0.80 mass % or less; and
   the clad percentage of each of the first and second filler materials is 6% or more and 16% or less of a total thickness of the brazing sheet.

2. The aluminum-alloy, fin material according to claim 1, wherein the aluminum alloy composition of the core material further contains Zn: 0.3 mass % or more and 3.0 mass % or less.

3. The aluminum-alloy, fin material according to claim 1, wherein the Al—Si series alloy that constitutes the first and second filler materials further contains Sr: 0.005 mass % or more and 0.050 mass % or less.

4. A method of manufacturing the aluminum-alloy, fin material according to claim 1, comprising:
   preparing by casting: a core-material slab having an aluminum alloy composition that contains Si: 0.02 mass % or more and 0.80 mass % or less, Fe: 0.02 mass % or more and 0.80 mass % or less, and Mn: 0.8 mass % or more and 2.0 mass % or less; and either only a first filler-material slab or first and second filler-material slabs each composed of an Al—Si series alloy that contains Si: 6.0 mass % or more and 13.0 mass % or less and Fe: 0.02 mass % or more and 0.80 mass % or less;
   either disposing two of the first filler-material slab on first and second surfaces of the core-material slab, respectively, or disposing the first filler-material slab on the first surface of the core-material slab and disposing the second filler-material slab on the second surface of the core-material slab, to prepare a clad slab;
   performing hot rolling on the clad slab to prepare a clad sheet;
   performing a first cold-rolling process on the clad sheet;
   annealing the clad sheet after the first cold-rolling process by heating it under conditions in which a total amount of diffusion M calculated according to Equation (1) below becomes $1.0 \times 10^{-14}$ m$^2$ or more and $5.0 \times 10^{-12}$ m$^2$ or less; and
   performing a second cold-rolling process on the clad sheet after the annealing process;
   wherein:

Equation (1) is:

$$M = \sum_{k=1}^{n} D_0 e^{-\frac{Q}{RT(k)}} \Delta t \qquad (1)$$

(n is the number of intervals when the total heating time is divided into units of time $\Delta t$,
$D_0$ is $1.37 \times 10^{-5}$ m$^2$/s,
Q is 123 KJ/mol,
R is 8.3145 J/(mol·K), and
T(k) is the heating temperature [K] at the start time of the $k^{th}$ interval.

5. The method according to claim 4, wherein the casting step includes a cool down step in which an average cooling rate of the core-material slab is 0.13° C./s or more as the core-material slab cools from 550° C. to 200° C.

6. The method according to claim 4, further comprising:
   after the casting step but before preparing the clad slab, subjecting the core-material slab to a homogenization treatment, in which the core-material slab is held at a temperature of 420-510° C. for 0.5-12 hours.

7. The method according to claim 4, wherein the hot rolling is performed after the clad slab has been pre-heated to a temperature of 420-500° C.

8. The method according to claim 7, wherein the temperature of the clad sheet at the completion of the hot rolling is 350° C. or lower and the hot rolling is completed within 40 minutes or less.

9. The method according to claim 4, wherein the first cold-rolling process is performed such that the clad sheet has a thickness of 85.0-99.5% of the thickness of the clad sheet prior to the first cold-rolling process.

10. The method according to claim 5, further comprising:
after the casting step but before preparing the clad slab, subjecting the core-material slab to a homogenization treatment, in which the core-material slab is held at a temperature of 420-510° C. for 0.5-12 hours.

11. The method according to claim 10, wherein:
the hot rolling is performed after the clad slab has been pre-heated to a temperature of 420-500° C.,
the temperature of the clad sheet at the completion of the hot rolling is 350° C. or lower and the hot rolling is completed within 40 minutes or less, and
the first cold-rolling process is performed such that the clad sheet has a thickness of 85.0-99.5% of the thickness of the clad sheet prior to the first cold-rolling process.

12. The method according to claim 11, wherein the aluminum alloy composition of the core material contains:
0.04-0.60 mass % Si;
0.05-0.70 mass % Fe;
1.0-1.8 mass % Mn; and
0.7-2.7 mass % Zn;
the remainder being Al and unavoidable impurities.

13. The aluminum-alloy, fin material according to claim 1, wherein the aluminum alloy composition of the core material contains 0.04-0.60 mass % Si.

14. The aluminum-alloy, fin material according to claim 1, wherein the aluminum alloy composition of the core material contains 0.05-0.70 mass % Fe.

15. The aluminum-alloy, fin material according to claim 1, wherein the aluminum alloy composition of the core material contains 1.0-1.8 mass % Mn.

16. The aluminum-alloy, fin material according to claim 1, wherein the aluminum alloy composition of the core material contains 0.7-2.7 mass % Zn.

17. The aluminum-alloy, fin material according to claim 1, wherein the aluminum alloy composition of the core material contains:
0.04-0.60 mass % Si;
0.05-0.70 mass % Fe;
1.0-1.8 mass % Mn; and
0.7-2.7 mass % Zn;
the remainder being Al and unavoidable impurities.

18. The aluminum-alloy, fin material according to claim 1, wherein the Al—Si series alloy of at least the first filer material contains 6.5-12.0 mass % Si.

19. The aluminum-alloy, fin material according to claim 1, wherein the Al—Si series alloy of at least the first filler material contains 0.10-0.60 mass % Fe.

20. The aluminum-alloy, fin material according to claim 17, wherein the Al—Si series alloy of at least the first filler material contains 6.5-12.0 mass % Si and 0.10-0.60 mass % Fe.

* * * * *